(12) United States Patent
Licht et al.

(10) Patent No.: US 10,894,856 B2
(45) Date of Patent: Jan. 19, 2021

(54) POLYURETHANE-VINYL HYBRID POLYMERS, METHODS OF MAKING THEM AND THEIR USE

(71) Applicant: BASF SE, Ludwigshafen am Rhein (DE)

(72) Inventors: Ulrike Licht, Ludwigshafen (DE); Dirk Wulff, Ludwigshafen (DE); Karl-Heinz Schumacher, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 71 days.

(21) Appl. No.: 16/343,919

(22) PCT Filed: Oct. 24, 2017

(86) PCT No.: PCT/EP2017/077065
§ 371 (c)(1),
(2) Date: Apr. 22, 2019

(87) PCT Pub. No.: WO2018/086860
PCT Pub. Date: May 17, 2018

(65) Prior Publication Data
US 2019/0256639 A1    Aug. 22, 2019

(30) Foreign Application Priority Data
Nov. 9, 2016 (EP) .................... 16197869

(51) Int. Cl.
| | | |
|---|---|---|
| *C08G 18/08* | (2006.01) | |
| *C09D 7/65* | (2018.01) | |
| *B32B 7/12* | (2006.01) | |
| *B32B 27/40* | (2006.01) | |
| *C08G 18/34* | (2006.01) | |
| *C08G 18/48* | (2006.01) | |
| *C08G 18/68* | (2006.01) | |
| *C08G 18/76* | (2006.01) | |
| *C09D 4/06* | (2006.01) | |
| *C08F 22/14* | (2006.01) | |
| *B32B 27/36* | (2006.01) | |
| *C08G 18/67* | (2006.01) | |

(52) U.S. Cl.
CPC ............ *C08G 18/0823* (2013.01); *B32B 7/12* (2013.01); *B32B 27/36* (2013.01); *B32B 27/40* (2013.01); *C08F 22/14* (2013.01); *C08G 18/348* (2013.01); *C08G 18/4825* (2013.01); *C08G 18/675* (2013.01); *C08G 18/68* (2013.01); *C08G 18/7621* (2013.01); *C09D 4/06* (2013.01); *C09D 7/65* (2018.01); *C08G 2170/40* (2013.01); *C08G 2170/80* (2013.01)

(58) Field of Classification Search
CPC ... C09D 7/65; C09D 4/00; C09D 4/06; C08G 2170/40; C08G 2170/80; C08G 18/0823; C08G 18/378; C08G 18/4825; C08G 18/675; C08G 18/68; C08G 18/7621; C08F 22/10; C08F 22/12; C08F 22/14; C08F 22/26; B32B 2405/00; B32B 2307/732; B32B 2307/748; B32B 2255/10; B32B 2255/205; B32B 27/08; B32B 27/28; B32B 27/32; B32B 27/34; B32B 27/36; B32B 27/40; B32B 15/08; B32B 15/20; B32B 7/12
See application file for complete search history.

(56) References Cited

U.S. PATENT DOCUMENTS

| | | |
|---|---|---|
| 3,412,054 A | 11/1968 | Milligan et al. |
| 3,905,929 A | 9/1975 | Noll |
| 3,920,598 A | 11/1975 | Reiff et al. |
| 5,804,360 A * | 9/1998 | Schell ............... C08F 283/006 430/215 |
| 2008/0154016 A1 | 6/2008 | Burghardt et al. |
| 2014/0275400 A1 | 9/2014 | Chen et al. |
| 2014/0288230 A1 | 9/2014 | Malofsky et al. |
| 2014/0329980 A1 | 11/2014 | Malofsky et al. |
| 2015/0210894 A1 | 7/2015 | Malofsky et al. |
| 2017/0050914 A1 | 2/2017 | Malofsky et al. |
| 2017/0073438 A1 | 3/2017 | Malofsky et al. |

FOREIGN PATENT DOCUMENTS

| | | |
|---|---|---|
| DE | 1 495 745 | 6/1969 |
| DE | 1 954 090 | 5/1971 |
| DE | 2 034 479 | 1/1972 |
| DE | 26 45 779 A1 | 4/1978 |

(Continued)

OTHER PUBLICATIONS

International Search Report dated Jan. 12, 2018 in PCT/EP2017/077065 filed Oct. 24, 2017.

*Primary Examiner* — Christopher M Rodd
(74) *Attorney, Agent, or Firm* — Oblon, McClelland, Maier & Neustadt, L.L.P.

(57) ABSTRACT

Described are polyurethane-vinyl hybrid polymers, methods of making them and their use. The hybrid polymers are made from an anionic polyurethane and a polymerizable vinyl compound, wherein the polymerizable vinyl compound is selected from methylene malonates, methylene beta-ketoesters and methylene beta-diketones. The hybrid polymers can be used as binder in structural adhesives, as binder in pressure-sensitive adhesives, as binder in laminating adhesives, as binder in contact adhesives, as binder in ink, as binder in paints, as binder in coatings, as binder for fiber bonding, as binder for particle bonding or as binder in high cohesion adhesive tapes.

16 Claims, No Drawings

(56) References Cited

FOREIGN PATENT DOCUMENTS

| | | |
|---|---|---|
| DE | 39 11 827 A1 | 10/1990 |
| DE | 10 2017 204 525 A1 | 9/2017 |
| EP | 0 622 378 A1 | 11/1994 |
| EP | 3 067 399 A1 | 9/2016 |
| WO | WO 2006/087317 A2 | 8/2006 |
| WO | WO 2012/054616 A2 | 4/2012 |
| WO | WO 2012/054633 A2 | 4/2012 |
| WO | WO 2013/059473 A2 | 4/2013 |
| WO | WO 2013/059479 A2 | 4/2013 |
| WO | WO 2013/066629 A1 | 5/2013 |
| WO | WO 2013/149165 A1 | 10/2013 |
| WO | WO 2013/149168 A1 | 10/2013 |
| WO | WO 2014/078689 A1 | 5/2014 |
| WO | WO 2014/110388 A1 | 7/2014 |
| WO | WO 2016/040012 A1 | 3/2016 |

* cited by examiner

POLYURETHANE-VINYL HYBRID POLYMERS, METHODS OF MAKING THEM AND THEIR USE

The invention relates to polyurethane-vinyl hybrid polymers, methods of making them and their use. The hybrid polymers are made from an anionic polyurethane and a polymerizable vinyl compound, wherein the polymerizable vinyl compound is selected from methylene malonates, methylene beta-ketoesters and methylene beta-diketones. The hybrid polymers can be used as binder in structural adhesives, as binder in pressure-sensitive adhesives, as binder in laminating adhesives, as binder for contact adhesives, as binder in ink, as binder in paints, as binder in coatings, as binder for fiber bonding, as binder for particle bonding or as binder in high cohesion adhesive tapes.

Binders and adhesives are often based on two-component adhesive polymer systems which generally require a crosslinker in order to obtain sufficient bond strength, chemical resistance or heat stability. In particular aqueous based pressure sensitive adhesives often have lower cohesive strength compared to organic solvent based adhesives. In particular, aqueous pressure sensitive adhesives (PSA) for high cohesive tapes often do not reach the performance of solvent based PSA in terms of adhesion/cohesion balance. Although cohesion can be improved by crosslinking, this often is associated with an unwanted significant decrease in adhesion.

Frequently adhesives are formulated using isocyanate crosslinker in combination with polyol components. These systems can be applied as solvent-free and water-free 100%-systems or as organic solvent based adhesive solutions or as water-based aqueous polymer dispersions. Disadvantages are that these formulations have a relatively low working time (known as pot life) and may be objectionable on health grounds due to the reactive isocyanate crosslinker. Therefore, it is desirable to provide alternative, isocyanate-free binders and adhesives. Therefore, it is desired to provide alternative, isocyanate-free crosslinked polymers, especially suitable for aqueous based binders or aqueous based adhesives with a good adhesion/cohesion balance.

WO 2013/149168 describes laminate articles made with laminate adhesives comprising methylene malonates, methylene beta-ketoesters or methylene beta-diketones using relatively large amounts of adhesive in the examples.

WO 2013/149165 describes activating methods, e.g. by anionic mechanism, for initiating polymerization of methylene malonates and other polymerizable compositions, wherein the polymerization activator is carried in inactive engagement in the polymerizable composition.

WO 2013/059473 describes multifunctional monomers, including multifunctional methylene malonate and methylene beta-ketoester monomers.

WO 2016/040012 describes a method of anionic polymerizing 1,1-disubstituted alkenes, such as methylene malonates, in the presence of nonionic emulsifiers and bases in water.

Not pre-published patent application with application number EP16161811.1 describes composite film laminates for flexible packaging wherein the laminating adhesive comprises polymerizable vinyl compounds selected from methylene malonates, methylene beta-ketoesters and methylene beta-diketones. Aqueous anionic polyurethane dispersions may be used as primers with a molar ratio of anionic groups of the polyurethane to the vinyl groups of the polymerizable vinyl compounds of 1:10 to 1:1 million.

WO 2006/087317 describes polyurethane dispersions for composite film lamination.

The object of the invention was to provide alternative, isocyanate-free, crosslinked polymers, suitable as binders for coatings and adhesives, in particular aqueous based binders or aqueous based adhesives with a good adhesion/cohesion balance.

It was found that vinyl compounds selected from methylene malonates, methylene beta-ketoesters and methylene beta-diketones polymerize anionically in the dispersed particles of water-based polyurethane dispersions to form polyurethane-vinyl hybrid polymers with outstanding properties. For example, pressure sensitive adhesives from aqueous polyurethane dispersions and methylene malonates show high cohesion and high peel on steel in tape applications.

It has been found that the object of the invention can be achieved by polyurethane-vinyl hybrid polymers made from at least one anionic polyurethane and at least one polymerizable vinyl compound, wherein the polymerizable vinyl compound is selected from methylene malonates, methylene beta-ketoesters and methylene beta-diketones;
and wherein
a) the polyurethane-vinyl hybrid polymer is formed by first coating a substrate with an aqueous anionic polyurethane dispersion and subsequently overcoating with the polymerizable vinyl compound wherein the ratio of anionic groups of the polyurethane to vinyl groups of the polymerizable vinyl compound is greater than 1:9, preferably at least 1:1 or greater than 1:1 and up to 50:1;
or
b) wherein the polyurethane-vinyl hybrid polymer is formed in an aqueous dispersion.

Preferably, the polyurethane-vinyl hybrid polymers are made from methylene malonates.

Hybrid polymers are polymeric materials comprising structural units of at least two different polymeric classes, connected to one another on molecular level.

The invention also provides a use of the polyurethane-vinyl hybrid polymers as binder in structural adhesives, as binder in pressure-sensitive adhesives, as binder in laminating adhesives, as binder in contact adhesives, as binder in ink, as binder in paints, as binder in coatings, as binder for fiber bonding, as binder for particle bonding or as binder in high cohesion adhesive tapes. Contact adhesives are adhesives which are applied to both the two surfaces which are to be bonded.

The invention also provides a method of forming polyurethane-vinyl hybrid polymers, wherein at least one anionic polyurethane is reacted with at least one polymerizable vinyl compound selected from methylene malonates, methylene beta-ketoesters and methylene beta-diketones,
wherein the reaction is performed in a liquid medium to form a one-component composition containing at least one polyurethane-vinyl hybrid polymer;
or wherein a first liquid composition comprising the at least one anionic polyurethane and a second liquid composition comprising the at least one polymerizable vinyl compound are mixed, subsequently applied to a substrate and the formation of the polyurethane-vinyl hybrid polymer occurs at least partly after application to the substrate;
or wherein the polyurethane-vinyl hybrid polymer is formed by first coating a substrate with the at least one anionic polyurethane and subsequently overcoating the first coating with the at least one polymerizable vinyl compound with a molar ratio of the anionic groups of the polyurethane to the vinyl groups of the polymerizable vinyl compound of greater than 1:9, preferably greater than 1:1.

Glass transition temperature (Tg) is determined by differential scanning calorimetry (ASTM D 3418-08, midpoint temperature, heating rate 20° C./min). Room temperature is 20° C., unless otherwise indicated.

The polymerizable vinyl compounds have one, two or more methylene groups =CH$_2$.

Methylene malonates are compounds comprising at least one (e.g. one, two or more) group ~O—C(O)—C(C=CH$_2$)—C(O)—O~

Methylene beta-ketoesters are compounds comprising at least one (e.g. one, two or more) group ~C(O)—C(C=CH$_2$)—C(O)—O~

Methylene beta-diketones are compounds comprising at least one (e.g. one, two or more) group ~C(O)—C(C=CH$_2$)—C(O)~

Preferred methylene malonates are compounds of the formula

R$^1$—O—C(O)—C(C=CH$_2$)—C(O)—O—R$^2$

Preferred methylene beta-ketoesters are compounds of the formula

R$^1$—C(O)—C(C=CH$_2$)—C(O)—O—R$^2$

Preferred methylene beta-diketones are compounds of the formula

R$^1$—C(O)—C(C=CH$_2$)—C(O)—R$^2$ wherein R$^1$, R$^2$ are each independently C1-C15 alkyl, C2-C15 alkenyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl or heteroaryl-(C1-C15 alkyl), or alkoxy-(C1-15 alkyl), each of which may be optionally substituted by C1-C15 alkyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl, C1-C15 alkoxy, C1-C15 alkylthio, hydroxyl, nitro, azido, cyano, acyloxy, carboxy, ester or sulfonyl; or wherein R$^1$ and R$^2$ are taken together with the atoms to which they are bound to form a 5-7 membered heterocyclic ring which may be optionally substituted by C1-C15 alkyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl, C1-C15 alkoxy, C1-C15 alkylthio, hydroxyl, nitro, azido, acyloxy, carboxy, ester or sulfonyl.

The polymerizable vinyl compounds can be monofunctional, i.e. have only a single vinyl group or they can be polyfunctional having two or more than two vinyl groups. Preferred polyfunctional polymerizable vinyl compounds are the formula:

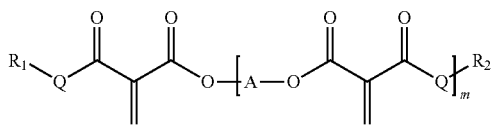

wherein R$^1$, R$^2$ are each independently C1-C15 alkyl, C2-C15 alkenyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl or heteroaryl-(C1-C15 alkyl), or alkoxy-(C1-15 alkyl), each of which may be optionally substituted by C1-C15 alkyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl, C1-C15 alkoxy, C1-C15 alkylthio, hydroxyl, nitro, azido, cyano, acyloxy, carboxy, ester or sulfonyl; or wherein R$^1$ and R$^2$ are taken together with the atoms to which they are bound to form a 5-7 membered heterocyclic ring which may be optionally substituted by C1-C15 alkyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl, C1-C15 alkoxy, C1-C15 alkylthio, hydroxyl, nitro, azido, acyloxy, carboxy, ester or sulfonyl;

[A]-represents-(CR$^A$R$^B$)$_n$—, —(CR$^A$R$^B$)$_n$—O(C=O)—(CH$_2$)$_{1-15}$—(C=O)O—(CR$^A$R$^B$)$_n$—, —(CH$_2$)$_n$—[CY]—(CH$_2$)$_n$, a polybutadienyl linking group, a polyethylene glycol linking group, a polyether linking group, a polyurethane linking group, an epoxy linking group, a polyacrylic linking group, or a polycarbonate linking group;

each instance of R$^A$ or R$^B$ is independently H, C$_1$-C$_{15}$ alkyl, C$_2$-C$_{15}$ alkenyl, a moiety represented by the formula:

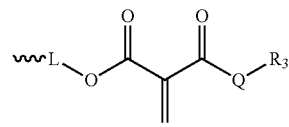

wherein L is a linking group selected from the group consisting of alkylene, alkenylene, haloalkylene, cycloalkylene, cycloalkylene, heterocyclylene, heterocyclyl alkylene, aryl-alkylene, heteroarylene or heteroaryl-(alkylene), or alkoxy-(alkylene), each of which may be optionally branched and each of which may be optionally substituted by alkyl, haloalkyl, cycloalkyl, halo cycloalkyl, heterocyclyl, heterocyclyl-(alkyl), aryl, aryl-(alkyl), heteroaryl, C1-C15 alkoxy, C1-C15 alkylthio, hydroxyl, nitro, azido, cyano, acyloxy, carboxy, ester, each of which may be optionally branched;

R$_3$ is independently selected from the group defined in R$_2$ above;

[CY] represents an alkyl, alkenyl, haloalkyl, cycloalkyl, halo cycloalkyl, heterocyclyl, heterocyclyl-(alkyl), aryl-(alkyl), heteroaryl or heteroaryl-(alkyl), or alkoxy-(alkyl) group;

n is an integer from 1 to 25;

m is an integer from 1 to 25, preferably from 2 to 25;

and each instance of Q represents —O— or a direct bond.

Preferred polyurethane-vinyl hybrid polymers are those wherein the polymerizable vinyl compound is selected from compounds of the formula

R$^1$—O—C(O)—C(C=CH$_2$)—C(O)—O—R$^2$ wherein R$^1$, R$^2$ are each independently C1-C10 alkyl, for example methyl, ethyl, propyl, butyl, Pentyl, hexyl, heptyl, octyl etc, and wherein the alkyl groups can be linear, branched or cyclic; or wherein the polymerizable vinyl compound is selected from compounds of the formula

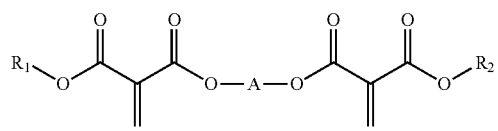

wherein R$^1$, R$^2$ are each independently C1-C10 alkyl, for example methyl, ethyl, propyl, butyl, Pentyl, hexyl, heptyl, octyl etc, and wherein the alkyl groups can be linear, branched or cyclic; A is selected from C1-C10 alkylene and —X-Ph-Y—, wherein X and Y are each independently C1-C10 alkylene, most preferably methylene. C1-C10 alkylene can be methylene, ethylene, propylene, butylene, pentylene, hexylene etc.

Methods of making methylene malonates are described in WO 2014/110388, WO 2012/054616 and WO 2012/054633. Methods of making methylene beta-diketones are described in WO 2013/059479. Methods of making methylene beta-ketoesters are described in WO 2013/066629. Methods of making multifunctional vinyl compounds are described in WO 2013/059473.

The amount of anionic groups of the polyurethane is preferably from 50 mmol/kg to 500 mmol or from 50 mmol/kg to 450 mmol/kg based on dry material. Preferred anionic groups of the polyurethane are selected from carboxylate groups, sulfonate groups and phosphate groups. Most preferably are carboxylate groups, especially with sodium or potassium as counterion.

Anionic polyurethanes are polyurethanes comprising anionic groups. The anionic groups can be pendent from the polyurethane backbone or they can be terminal at the end of the polymeric chain. Preferred are anionic polyurethanes with anionic groups pendent from the polyurethane backbone.

The anionic polyurethanes comprise monomers having anionic groups, as structural components. Anionic groups are especially the sulfonate group, the carboxylate group, and the phosphate group, in the form of their salts, e.g. their alkali-metal salts or their ammonium salts. Other anionic groups for the purposes of the invention are potentially anionic groups which can be converted via simple neutralization reactions or hydrolysis reactions into the abovementioned ionic hydrophilic groups, examples therefore being carboxylic acid groups. Ionic monomers and potentially ionic monomers are described in detail by way of example in Ullmanns Enzyklopädie der technischen Chemie [Ullmann's Encyclopedia of Industrial Chemistry], 4th edition, volume 19, S.311-313, and by way of example in DE-A 1 495 745.

The anionic polyurethanes are preferably composed of a) polyisocyanates, preferably at least one diisocyanate, b) polyols, preferably at least one polyesterdiol and/or at least one polyetherdiol, and c) optionally further mono- or polyfunctional compounds having reactive groups by way of example selected from alcoholic hydroxy groups, primary amino groups, secondary amino groups, and isocyanate groups, where at least one of the structural components has one or more anionic groups.

Examples of suitable diisocyanates are those of the formula $X(NCO)_2$, where X is an aliphatic hydrocarbon radical having from 4 to 15 carbon atoms, a cycloaliphatic or aromatic hydrocarbon radical having from 6 to 15 carbon atoms, or an araliphatic hydrocarbon radical having from 7 to 15 carbon atoms. Examples of these diisocyanates are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI), e.g. the trans/trans isomer, the cis/cis isomer, and the cis/trans isomer, and also mixtures composed of these compounds. These diisocyanates are available commercially. Particularly important mixtures of these isocyanates are the mixtures of the respective structural isomers of diisocyanatotoluene and diisocyanatodiphenylmethane, and the mixture made of 80 mol % of 2,4-diisocyanatotoluene and 20 mol % of 2,6-diisocyanatotoluene is particularly suitable. The mixtures of aromatic isocyanates, such as 2,4-diisocyanatotoluene and/or 2,6-diisocyanatotoluene, with aliphatic or cycloaliphatic isocyanates, such as hexamethylene diisocyanate or IPDI are also particularly advantageous, the preferred mixing ratio of the aliphatic to aromatic isocyanates being from 1:9 to 9:1, in particular from 1:4 to 4:1.

The structure of the polyurethanes can also use, as polyisocyanate compounds other than the abovementioned compounds, isocyanates which bear not only the free isocyanate groups but also other capped isocyanate groups, e.g. uretdione groups.

It is preferable that each of the polyurethanes is composed of at least 40% by weight, particularly preferably at least 60% by weight, and very particularly preferably at least 80% by weight, of diisocyanates, polyetherdiols, and/or polyesterdiols. It is preferable that the polyurethanes comprise an amount of more than 10% by weight, particularly preferably greater than 30% by weight, in particular greater than 40% by weight or greater than 50% by weight, and very particularly preferably greater than 60% by weight, based on the polyurethane, of polyesterdiols or polyetherdiols, or a mixture thereof.

Polyesterdiols that can be used are mainly relatively high-molecular-weight diols with molar mass from above 500 up to 5000 g/mol, preferably about 1000 to 3000 g/mol. The molar mass of polyetherdiols is preferably from 240 to 5000 g/mol. This is the number-average molar mass Mn. Mn is obtained from determination of the number of end groups (OH number).

Polyesterdiols are known by way of example from Ullmanns Enzyklopädie der technischen Chemie [Ullmann's Encyclopedia of Industrial Chemistry], 4th edition, volume 19, pp. 62 to 65. It is preferable to use polyesterdiols which are obtained via reaction of dihydric alcohols with dihydric carboxylic acids. Instead of the free carboxylic acids, it is also possible to use the corresponding polycarboxylic anhydrides or corresponding polycarboxylic esters of lower alcohols, or a mixture of these, to produce the polyester polyols. The polycarboxylic acids can be aliphatic, cycloaliphatic, araliphatic, aromatic, or heterocyclic, and, if appropriate, can have unsaturation and/or substitution, for example by halogen atoms. Examples that may be mentioned of these are: suberic acid, azelaic acid, phthalic acid, isophthalic acid, phthalic anhydride, tetrahydrophthalic anhydride, hexahydrophthalic anhydride, tetrachlorophthalic anhydride, endomethylene-tetrahydrophthalic anhydride, dimeric fatty acids. Preference is given to dicarboxylic acids of the general formula $HOOC-(CH_2)_y-COOH$, where y is a number from 1 to 20, preferably an even number from 2 to 20, examples being succinic acid, adipic acid, sebacic acid, and dodecanedicarboxylic acid.

Examples of dihydric alcohols that can be used for producing the polyesterdiols are ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes, such as 1,4-bis(hydroxymethyl) cyclohexane, 2-methylpropane-1,3-diol, methylpentanediols, and also diethylene glycol, triethylene glycol, tetraethylene glycol, polyethylene glycol, dipropylene glycol, polypropylene glycol, dibutylene glycol, and polybutylene glycols. Preference is given to alcohols of the general formula HO—(CH$_2$)$_x$—OH, where x is a number from 1 to 20, preferably an even number from 2 to 20. Examples of these materials are ethylene glycol, butane-1,4-diol, hexane-1,6-diol, octane-1,8-diol, and dodecane-1,12-diol. Preference is further given to neopentyl glycol.

In addition to the polyesterdiols or the polyetherdiols, it is also possible, if appropriate, to make concomitant use of the polycarbonatediols that can by way of example be obtained via reaction of phosgene with an excess of the low-molecular-weight alcohols mentioned as structural components for the polyester polyols. It is also possible, if appropriate, to use lactone-based polyesterdiols, these being homo- or copolymers of lactones, preferably products derived from addition reactions of lactones onto suitable difunctional starter molecules and having terminal hydroxy groups. Lactones that can be used are preferably those deriving from compounds of the general formula HO—(CH$_2$)$_z$—COOH, where z is a number from 1 to 20, and a hydrogen atom of a methylene unit can also have been substituted by a $C_1$-$C_4$-alkyl radical. Examples are ε-caprolactone, β-propiolactone, γ-butyrolactone, and/or methyl-ε-caprolactone, and also mixtures of these. Examples of suitable starter components are the low-molecular-weight dihydric alcohols mentioned above as structural components for the polyester polyols. Particular preference is given to the corresponding polymers of ε-caprolactone. Lower polyesterdiols or polyetherdiols can also have been used as starters for producing the lactone polymers. Instead of the polymers of lactones, it is also possible to use the corresponding chemically equivalent polycondensates of the hydroxycarboxylic acids that correspond to the lactones.

Polyetherdiols can be obtained in particular via homopolymerization of ethylene oxide, propylene oxide, butylene oxide, tetrahydrofuran, styrene oxide, or epichlorohydrin, e.g. in the presence of BF$_3$, or via an addition reaction of these compounds, if appropriate in a mixture or in succession, onto starter components having reactive hydrogen atoms, examples being alcohols or amines, e.g. water, ethylene glycol, propane-1,2-diol, propane-1,3-diol, 2,2-bis(4-hydroxyphenyl)propane, or aniline. Particular preference is given to propylene oxide, and to polytetrahydrofuran of number-average molecular weight from 240 to 5000, and especially from 500 to 4500. Preference is given to polyetherdiols composed of less than 20% by weight of ethylene oxide.

It is also possible to make concomitant use of polyhydroxyolefins, preferably those having 2 terminal hydroxyl groups, e.g. α,ω-dihydroxypolybutadiene, α,ω-dihydroxypolymethacrylic ester, or α,ω-dihydroxypolyacrylic ester, as monomers (c1). These compounds are known by way of example from EP-A 622 378. Other suitable polyols are polyacetals, polysiloxanes, and alkyd resins.

The polyetherdiols have preferably been selected from polytetrahydrofuran and polypropylene oxide. The polyesterdiols have preferably been selected from reaction products of dihydric alcohols with dibasic carboxylic acids and lactone-based polyesterdiols.

The hardness and modulus of elasticity of the polyurethanes can, if necessary, be increased if the diols used comprise not only the polyesterdiols and, respectively, the polyetherdiols but also low-molecular-weight monomeric diols which differ therefrom with molar mass of about 60 to 500 g/mol, preferably 62 to 200 g/mol. Low-molecular-weight monomeric diols used are especially the structural components of the short-chain alkanediols mentioned for the production of polyester polyols, preference being given here to the unbranched diols having from 2 to 12 carbon atoms and having an even number of carbon atoms, and also to pentane-1,5-diol and neopentyl glycol. Examples are ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes, such as 1,4-bis(hydroxymethyl)cyclohexane, 2-methylpropane-1,3-diol, and methylpentanediols, and other compounds that can be used are diethylene glycol, triethylene glycol, tetraethylene glycol, polyethylene glycol, dipropylene glycol, polypropylene glycol, dibutylene glycol, and polybutylene glycols. Preference is given to alcohols of the general formula HO—(CH$_2$)$_x$—OH, where x is a number from 1 to 20, preferably an even number from 2 to 20. Examples here are ethylene glycol, butane-1,4-diol, hexane-1,6-diol, octane-1,8-diol, and dodecane-1,12-diol. Preference is further given to neopentyl glycol. The proportion of the polyesterdiols and, respectively, of the polyetherdiols, based on the total amount of all of the diols, is preferably from 10 to 100 mol %, and the proportion of the low-molecular-weight, monomeric diols, based on the total amount of all of the diols, is preferably form 0 to 90 mol %. It is particularly preferable that the ratio of the polymeric diols to the monomeric diols is from 0.1:1 to 5:1, particularly from 0.2:1 to 2:1.

In order to improve water-dispersibility of the polyurethanes, the polyurethanes can also comprise, as structural component, monomers which bear at least one isocyanate group or which bear at least one group reactive toward isocyanate groups and which moreover bear at least one hydrophilic group or one group which can be converted into a hydrophilic group. The hydrophilic groups react with isocyanates substantially more slowly than the functional groups of the monomers which serve for the structure of the main polymer chain. The proportion of components having hydrophilic groups, based on the total amount of all of the structural components of the polyurethanes, is generally judged in such a way that the molar amount of the hydrophilic groups, based on the total weight of all of the monomers, is from 30 to 1000 mmol/kg, preferably from 50 to 500 mmol/kg, and particularly preferably from 80 to 300 mmol/kg. The hydrophilic groups can be nonionic or preferably ionic hydrophilic groups. Particular nonionic hydrophilic groups that can be used are polyethylene glycol ethers preferably made of from 5 to 100, with preference from 10 to 80, repeat units of ethylene oxide. The content of polyethylene oxide units is generally form 0 to 10% by weight, preferably from 0 to 6% by weight, based on the total amount of all of the monomers. Preferred monomers having nonionic hydrophilic groups are polyethylene oxide diols having at least 20% by weight of ethylene oxide, polyethylene oxide monools, and also the reaction products of a polyethylene glycol and of a diisocyanate, where these bear a terminally etherified polyethylene glycol radical. Patent specifications U.S. Pat. Nos. 3,905,929 and 3,920,598 cite diisocyanates of this type and processes for producing the same.

The anionic polyurethanes can be made from monomers having anionic groups and/or potentially anionic groups, such as for example aliphatic, cycloaliphatic, araliphatic, or aromatic carboxylic acids or sulfonic acids which bear at least one alcoholic hydroxy group or which bear at least one primary or secondary amino group. Preference is given to the dihydroxyalkylcarboxylic acids, especially those having from 3 to 10 carbon atoms, also described in U.S. Pat. No. 3,412,054. Compounds of the general formula (c1)

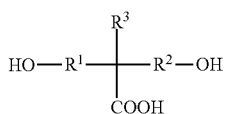
(c₁)

in which $R^1$ and $R^2$ are a C1-C4-alkanediyl unit and $R^3$ is a C1-C4-alkyl unit are particularly preferred, especially dimethylolpropionic acid (DMPA). Other suitable (potentially) anionic monomeric compounds are the corresponding dihydroxysulfonic acids and dihydroxyphosphonic acids, such as 2,3-dihydroxypropanephosphonic acid. Other suitable anionic monomeric compounds are dihydroxy compounds with molar mass from above 500 to 10 000 g/mol having at least two carboxylate groups and disclosed in DE-A 39 11 827. They are obtainable via reaction of dihydroxy compounds with tetracarboxylic dianhydrides, such as pyromellitic dianhydride or cyclopentanetetracarboxylic dianhydride, in a molar ratio of from 2:1 to 1.05:1, in a polyaddition reaction. Particularly suitable dihydroxy compounds are the monomers listed as chain extenders, and also the above-mentioned diols.

Particularly preferred anionic structural components have carboxy groups. The carboxy groups can be introduced into the polyurethanes by way of the above-mentioned aliphatic, cycloaliphatic, araliphatic, or aromatic carboxylic acids which bear at least one alcoholic hydroxy group or which bear at least one primary or secondary amino group. Preference is given to dihydroxyalkylcarboxylic acids, especially having from 3 to 10 carbon atoms, particularly dimethylolpropionic acid. One particularly preferred structural component for anionic polyurethanes is 2,2-bis(hydroxymethyl)propionic acid (dimethylolpropionic acid, DMPA).

Other anionic structural components that can be used, having amino groups reactive toward isocyanates, are aminocarboxylic acids, such as lysine or β-alanine, or the adducts mentioned in DE-A 20 34 479 of aliphatic diprimary diamines with alpha,beta-unsaturated carboxylic or sulfonic acids. These compounds comply by way of example with the formula (c2)

 (c2)

in which $R^4$ and $R^5$, independently of one another, are a $C_1$-$C_6$-alkanediyl unit, preferably ethylene, and X is COOH or $SO_3H$. Particularly preferred compounds of the formula (c2) are N-(2-aminoethyl)-2-aminoethanecarboxylic acid, and also N-(2-aminoethyl)-2-aminoethanesulfonic acid and the corresponding alkali-metal salts, particular preference being given here to Na as counterion. Particular preference is further given to the adducts of the above-mentioned aliphatic diprimary amines with 2-acrylamido-2-methylpropanesulfonic acid, for example those described in DE-B 1 954 090.

If monomers having potentially ionic groups are used, they can be converted to the ionic form prior to or during, but preferably after, the isocyanate-polyaddition reaction, since the ionic monomers are often only sparingly soluble in the reaction mixture. Examples of neutralizing agents are ammonia, NaOH, triethanolamine (TEA), triisopropylamine (TIPA) or morpholine, or derivatives thereof. It is particularly preferable that the sulfonate or carboxylate groups are put into the form of their salts with an alkali-metal ion or with an ammonium ion as counterion.

Further, polyfunctional monomers can be used for the crosslinking or chain-extension of the polyurethanes. These are generally more than dihydric non-phenolic alcohols, amines having 2 or more primary and/or secondary amino groups, or else compounds which bear not only one or more alcoholic hydroxy groups but also one or more primary and/or secondary amino groups. Examples of alcohols having functionality higher than 2 which can be used to adjust to a particular degree of branching or crosslinking are trimethylolpropane, glycerol, or sugars. It is also possible to use polyamines having 2 or more primary and/or secondary amino groups, and monoalcohols, where these bear, in addition to the hydroxy group, a further group reactive toward isocyanates, examples being monoalcohols having one or more primary and/or secondary amino groups, e.g. monoethanolamine. The polyurethanes preferably comprise from 1 to 30 mol %, particularly preferably from 4 to 25 mol %, based on the total amount of all of the structural components, of a polyamine having at least two amino groups reactive toward isocyanates. It is also possible to use isocyanates of functionality greater than 2 for the same purpose. Examples of commercially available compounds are the isocyanurate or the biuret of hexamethylene diisocyanate.

Monofunctional monomers which are used optionally are monoisocyanates, monoalcohols, and monoprimary and monosecondary amines. Their proportion is generally at most 10 mol %, based on the total molar amount of the monomers. These monofunctional compounds usually bear further functional groups, e.g. olefinic groups or carbonyl groups, and are used to introduce, into the polyurethane, functional groups which permit dispersion or, respectively, crosslinking or further polymer-analogous reaction of the polyurethane. Monomers that can be used for this are isopropenyl-α,α-dimethylbenzyl isocyanate (TMI) and esters of acrylic or methacrylic acid, e.g. hydroxyethyl acrylate or hydroxyethyl methacrylate.

The method for adjusting the molecular weight of the polyurethanes via selection of the proportions of the monomers that can react with one another, and selection of the arithmetic average of the number of reactive functional groups per molecule, is well known in the field of polyurethane chemistry. The components and their respective molar amounts are normally selected in such a way that the ratio A:B, where A is the molar amount of isocyanate groups, and
B is the total of the molar amount of the hydroxy groups and the molar amount of the functional groups that can react with isocyanates in an addition reaction, is from 0.5:1 to 2:1, preferably from 0.8:1 to 1.5:1, particularly preferably from 0.9:1 to 1.2:1. It is very particularly preferable that the ratio A:B is as close as possible to 1:1. The monomers usually bear an average of from 1.5 to 2.5, preferably from 1.9 to 2.1, particularly preferably 2.0, isocyanate groups and, respectively, functional groups which can react with isocyanates in an addition reaction.

The polyaddition reaction of the structural components to produce the polyurethane preferably takes place at reaction temperatures of up to 180° C., preferably up to 150° C., at atmospheric pressure or under autogenous pressure. The production of polyurethanes and of aqueous polyurethane dispersions is known to the person skilled in the art.

The anionic polyurethane is preferably composed of
a) diisocyanates,
b) polyesterdiols with molar mass of greater than 500 to 5000 g/mol, and/or polyetherdiols with molar mass of from 240 to 5000 g/mol,
c) diols having carboxylic acid groups, and d) optionally further mono- or polyfunctional compounds which differ from a)-c) and have reactive groups, selected from alcoholic hydroxy groups, primary amino groups, secondary amino groups, and isocyanate groups.

The polyurethanes preferably take the form of aqueous dispersion and are preferably used in this form in the reaction with the vinyl compounds.

The polyurethane-vinyl hybrid polymers according to the invention are preferably contained in a liquid composition, such as an organic solvent or most preferred in dispersed form in an aqueous dispersion.

The polyurethane-vinyl hybrid polymer according to the invention is preferably made from an anionic polyurethane which has a glass transition temperature, prior to polymerization of the polymerizable vinyl compound, below 0° C., preferably below −10° C.

In one embodiment of the invention the polyurethane-vinyl hybrid polymer is a polymer where the ratio of the anionic groups of the polyurethane to the vinyl groups of the polymerizable vinyl compound is greater than 1:1 and the polymerizable vinyl compound is at least one polyfunctional methylene malonate with two or more methylene malonate groups.

The invention also relates to highly cohesive pressure-sensitive adhesives, which can be prepared by using soft polyurethane, preferably in the form of aqueous polyurethane dispersions. Soft polyurethanes are polyurethanes with a glass transition temperature below −10° C. A highly cohesive pressure-sensitive adhesive (as defined herein) is a pressure-sensitive adhesive defined by a peel strength of more than 10 N/25 mm and a shear strength at room temperature of more than 60 min, measured as described in the examples.

The invention also relates to polyurethane-vinyl hybrid polymers which are semi-crystalline at room temperature are which are made from amorphous anionic polyurethanes, reacted with at least one polymerizable vinyl compound selected from methylene malonates, methylene beta-ketoesters and methylene beta-diketones; preferably methylene malonates, especially diethylmethylenemalonate.

Amorphous polyurethanes can be prepared by using amorphous polymeric polyols such as for example amorphous polyether polyols, amorphous polycarbonate polyols, amorphous polyhydroxyolefins or amorphous polyester polyols. Preferred amorphous polyether polyols are polypropylenglycol and poly-THF. Preferred amorphous polyester polyols are polyesterols of mixed aromatic/aliphatic diacids or polyesterols of linear diacids with branched diols.

The semi-crystalline polyurethane-vinyl hybrid polymers are especially suitable for use as laminating adhesives.

The invention also relates to polyurethane-vinyl hybrid polymers which are amorphous at room temperature and which are made from semi-crystalline polyurethanes, crosslinked with at least one polymerizable vinyl compound selected from methylene malonates, methylene beta-ketoesters and methylene beta-diketones, preferably methylene malonates.

Semi-crystalline polyurethanes can be prepared for example by using more than 50 weight-% (based on all macrodiols) of polyesterols of a regular structure; like polyesterols of alkylene diacids like adipic acid with linear diols like 1,6-hexanediol or 1,4-butanediol: or polycaprolactones.

Semi-crystalline polymers are polymers with a degree of crystallinity of preferably 10 to 80% at room temperature. Amorphous polymers are polymers with a degree of crystallinity of preferably less than 10% at room temperature. Crystalline polymers are polymers with a degree of crystallinity of preferably more than 80% at room temperature. The degree of crystallinity can be measured by differential scanning calorimetry.

The polyurethane-vinyl hybrid polymers can be used in the form of one-component compositions, optionally comprising conventional additives. Preferred one-component compositions are in the form of aqueous dispersion, containing at least one polyurethane-vinyl hybrid polymer dispersed in water. The dispersed particles comprise both, polyurethanes and anionically polymerized vinyl polymers, including grafted polymeric structures, i.e. polyurethanes grafted with vinyl polymers. These dispersions combine the properties of the anionic polyurethanes and the vinyl polymers in single dispersion particles.

Polymerization can be achieved at room temperature (25° C. or less), simply by adding the polymerizable vinyl compounds to the aqueous polyurethane dispersion and stirring. The polymerization can be accelerated and/or completed by raising the temperature above room temperature.

Emulsifiers can be added to stabilize aqueous polyurethane-vinyl hybrid polymer dispersions. Preferably, emulsifiers are used which do not start or slow down the anionic polymerization of the vinyl polymers. Preferred emulsifiers are nonionic. More preferred, no emulsifiers are added.

The polyurethane-vinyl hybrid polymers can also be used in the form of two-component compositions. Two-component compositions for forming a polyurethane-vinyl hybrid polymer are compositions wherein a first liquid composition comprises at least one anionic polyurethane and a second liquid composition comprises at least one polymerizable vinyl compound selected from methylene malonates, methylene beta-ketoesters and methylene beta-diketones. Each of the first and second compositions can optionally comprise conventional additives. A preferred first composition is in the form of an aqueous polyurethane dispersion, containing at least one anionic polyurethane dispersed in water. The two components are mixed shortly before application on a substrate. Preferably, at least part of the polyurethane-vinyl hybrid polymers are formed after application to the substrate and/or after film formation on a substrate.

Examples of optional additives include wetting agents, thickeners, protective colloids, UV-absorber, light stabilizers, biocides, defoamers, tackifiers, anti-oxidants, metal deactivators, antistatic agents, reinforcement agents, filler materials, anti-fogging agents, propellants, plasticizer, lubricants, emulsifier, colorants, pigments, rheology modifying agents, impact modifier, adhesion modifier, optical brightener, flame retardants, anti-dripping agents, nucleating agents, protective colloids, water, organic solvents, reactive diluents etc.

The polyurethane-vinyl hybrid polymers can be used for examples as binders for coatings or as binders for adhesives. The adhesives or coating compositions, or appropriately formulated preparations, can be applied to substrates which are to be bonded or coated, by means, for example, of knife coating, spreading, spraying etc. Typical coating techniques may be employed, examples being roller coating, reverse roller coating, gravure roller coating, reverse gravure roller coating, brush coating, rod coating, spray coating, air brush coating, meniscus coating, curtain coating or dip coating. After a short time for solvents or the water of the dispersion to evaporate (preferably after 1 to 60 seconds), the coated substrate may, in the case of adhesive applications, then be contacted with a second substrate, the temperature being for example from 20 to 200° C., preferably 20 to 100° C., and the pressure being for example from 0.1 to 3000 kN/m$^2$, preferable from 0.2 to 10 kN/m$^2$.

The coating can be applied for example in amounts of 0.1 to 2000 g/m$^2$, preferably in amounts of 1 to 200 g/m$^2$. The coating thickness is preferably from 0.1 µm to less than 2000 µm, for example from 1 to 200 µm. In case solvent (e.g. water or organic solvent) containing coating formulations, the coating thickness is that of the dried coating after evaporation of the solvent.

The compostions of the invention are employed preferably without additional crosslinking agents, more particularly without isocyanate crosslinkers. Examples of suitable substrates include polymer films, more particularly of polyethylene (PE), oriented polypropylene (OPP), unoriented polypropylene (CPP), polyamide (PA), polyethylene terephthalate (PET), polyacetate, PVC, cellophane, polymer films (vapor-)coated with metal, e.g., with aluminum (metalized films for short), or metal foils, of aluminum for example. The stated films and foils may be bonded with one another or with a foil or film of a different type—for example, polymer films with metal foils, different polymer films with one another, etc. The stated foils and films may also, for example, be printed with printing inks. The thickness of the substrate films may be, for example, from 5 to 100 µm, preferably from 5 to 40 µm.

One embodiment of the invention is a composite film wherein the material of a first film being selected from OPP, CPP, PE, PET, and PA, and the material of a second film being selected from OPP, CPP, PE, PET, PA, and metal foil. In one embodiment of the invention, the first film and/or the second film is metalized or printed on the respective side coated with the polymer dispersion of the invention.

Surface treatment of the film substrates prior to coating according to the invention is not absolutely necessary. Better results, however, may be obtained if the surface of the film substrates is modified prior to coating. In this case it is possible to employ typical surface treatments, an example being corona treatment, for the purpose of intensifying the adhesion effect. The corona treatment or other surface treatments are carried out to the extent required for sufficient wettability with the coating composition. Typically, corona treatment of approximately 10 watts per square meter per minute is sufficient for this purpose. Alternatively or additionally it is also possible, optionally, to use conventional primers or tie coats between film substrate and adhesive coating or pre-coating. Furthermore, other, additional functional layers may be present on the composite films, examples being barrier layers, print layers, color layers or varnish layers, or protective layers. These functional layers may be located externally, i.e., on the side of the film substrate facing away from the adhesive-coated side, or internally, between film substrate and adhesive layer.

Examples of other suitable substrates include rigid substrates like metals, glass, plastics (e.g. acrylnitril-butadiene-styrene copolymerisate (ABS), polyamide (PA), polystyrene (PS), polyvinyl chlorid (PVC), polycarbonate (PC), rubber), wood, chipboard, cardboard and polymer composites. Bonding or coating of these substrates may be done after surface treatment like plasma or corona treatment, etching, flame treatment or primer application, but is preferably done without any treatment if the hybrids according to the invention are used.

The curing of the coating or adhesive is preferably done at temperatures below 100° C., most preferably at 15 to 30° C. or at ambient temperature.

A method of the invention is a method of forming a laminate, wherein (1) a polymer film is coated with at least one anionic polyurethane (as described above);

(2) the coated polymer film is stored for at least 1 day (preferably at ambient conditions);

(3) the coated polymer film is overcoated with the at least one polymerizable vinyl compound wherein the molar ratio of the anionic groups of the polyurethane to the vinyl groups of the polymerizable vinyl compound is greater than 1:9, preferably greater than 1:1, and wherein the polymerizable vinyl compound is selected from methylene malonates, methylene beta-ketoesters and methylene beta-diketones;

and wherein the polymerizable vinyl compound has at least two, preferably at least three functional groups selected from methylene malonate group, methylene beta-ketoester group and methylene beta-diketone group; and (4) the overcoated polymer film is laminated to a substrate. The substrate can be one of the substrates mentioned above, preferably another polymer film or a rigid substrate as mentioned above. Lamination can be done at elevated temperature and pressure. Lamination temperature can be for example from 20 to 200° C., preferably from 40 to 100° C. Lamination pressure can be for example from 100 to 3000 kN/m$^2$, preferably from 300 to 2000 kN/m$^2$.

It is an advantage of the invention that a wide variety of different substrates can be bonded or coated ensuring effective adhesion of the adhesive or coating compositions to various substrates and producing a high strength in bonded assemblies.

Particular advantages of the products of the invention are the following in particular:

enables isocyanate-free and crosslinker-free compositions
enables 1-component as well as 2-component systems
high bond strength in short time
enables shape memory functionality

EXAMPLES

Monomer 1:

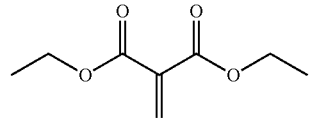

Diethyl methylene malonate

Monomer 2:

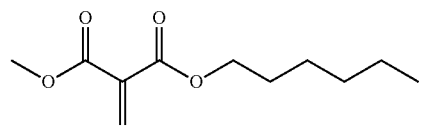

Methyl-hexyl methylene malonate

Monomer 3:

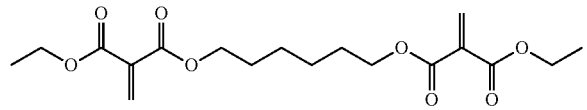 [SMILES: C=C(C(=O)OCC)C(=O)OCCCCCCOC(=O)C(=C)C(=O)OCC]

Monomer 4:

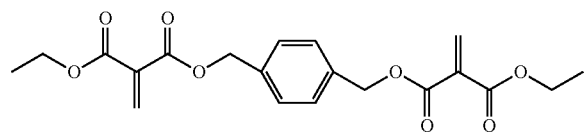 [SMILES: C=C(C(=O)OCC)C(=O)OCc1ccc(COC(=O)C(=C)C(=O)OCC)cc1]

Example 1 (Comparative)

An aqueous polyurethane dispersion was prepared according to example 1 in WO 2006/087317 and adjusted to a solids content of 50%.

Example 2

13.6 g dispersion from example 1 are placed in a 100 ml PE bottle and diluted with 3.4 g deionized water. At room temperature 3.4 g of a solution of monomer 3, (20% w/w in monomer 1) are added dropwise under vigorous stirring. After 12 hours stirring, the reaction was completed and a solids content of 48% reached.

Example 3

13.6 g dispersion from example 1 are placed in a 100 ml PE bottle and diluted with 3.4 g deionized water. At room temperature 3.4 g of a solution of monomer 4 (20% solution in monomer 1) are added dropwise under vigorous stirring. After 12 hours stirring, the reaction was completed and a solids content of 47% reached.

Example 4

6 g dispersion from example 1 are placed in a 100 ml PE bottle and diluted with 3 g deionized water. At room temperature 3 g of a solution of monomer 3 (20% solution in monomer 1) are added dropwise under vigorous stirring. After 12 hours stirring, the reaction was completed and a solids content of 47% reached.

Example 5

13.6 g dispersion from example 1 are placed in a 100 ml PE bottle and diluted with 5.1 g deionized water. At room temperature 5.1 g of a solution of monomer 3 (20% solution in monomer 1) are added dropwise under vigorous stirring. After 12 hours stirring, the reaction was completed and a solids content of 48% reached.

Performance Tests:

The PSA tests were performed according to AFERA test methods 5012 and 5001, unless otherwise indicated.

The pressure-sensitive adhesive dispersions were coated with coating weights as indicated in table 1 onto Hostaphan® RN 36 (PET) film as carrier, and dried at 90° C. for 5 minutes. The PSA-coated carrier was slit to give test strips 25 mm wide.

a) Shear Strength

For the determination of the shear strength, the test strips were adhered with an overlap of 12.5×12.5 mm to sheet steel, rolled on once with a roller weighing 1 kg, and then loaded in suspension with a 1 kg weight. The shear strength (cohesion) was determined under standard conditions (23° C.; 50% relative humidity). The measure of the shear strength is the time taken for the weight to fall off; in each case, the average was calculated from 5 measurements.

b) Peel Strength

For the determination of the peel strength, the test strips were adhered to sheet steel. The peel strength (adhesion) was determined under standard conditions (23° C.; 50% relative humidity) by separating the test strip from the steel in an angle of 180° with a velocity of 300 mm/min and measuring the force in N/25 mm.

Pressure sensitive adhesive films were prepared with the polymer dispersions from examples 1, 2, 3 and 5.

Table 1 summarizes the conditions and results of the PSA testing.

TABLE 1

| | | Test results | |
|---|---|---|---|
| Example | Coating weight [g/m$^2$] | Shear strength AFERA steel [min] | Peel strength AFERA steel [N/25 mm] |
| 1 comparative | 60 | 12 | 60 |
| 2 Hybrid | 57 | 120 | 15 |
| 3 Hybrid | 58 | 1512 | 21 |
| 5 Hybrid | 58 | 546 | 18 |

Test Conditions:

Carrier: Hostaphan® RN 36 (biaxial oriented film of polyethylene terephthalat (PET))

Liner: Siliconized paper (Steralease® 43 gelb)

Width: 25 mm

Drying 5 min at 90° C.

Test velocity: 300 mm/min

Climate chamber: 23° C., 50% rel. humidity

Shear strength: steel plate, overlap 12.5×12.5 mm, contact time 10 min, weight 1 kg Temperature: room temperature It can clearly be seen, that the hybrids show high cohesion and high adhesion to steel as aqueous pressure sensitive adhesives.

Example 6

The polyurethane from example 1 was diluted with ethanol to 10% solids content. This solution was wiped on two test specimen (stainless steel) and dried. 0.2 g of a mixture of 60% monomer 1, 20% monomer 2, 20% thickener Vinnol H15/45 M (Wacker) was placed between the test specimen at an overlap area of 625 mm$^2$ and fixed. After 48 h at room temperature a lap shear test was performed (Zwick Roell testing machine with 10 mm/min). A shear strength of 6 MPa are reached.

Example 6A (Comparative)

The experiment 6 was performed with a solution of 1% Na-benzoate in ethanol as a starter instead of the PU.

A shear strength of only 2 MPa are found.

Exppample 7

An aqueous polyurethane dispersion was prepared according to example 1 in DE 2645779 and adjusted to 39% solids content.

Example 8

The dispersion from example 7 was brushed onto stainless steel plates and dried, resulting in a tack-free film (0.1 g/625 mm²). A very thin film (<0.01 g) of a solution of monomer 3 (20% w/w in monomer 1) was wiped onto one plate and the plate was pressed together with a second one (without monomer) with an overlap of 625 mm² and fixed. After 48 h at room temperature a lap shear test was performed (Zwick Roell testing machine with 10 mm/min).

A shear strength of 8.8 MPa are reached.

Other lap shear samples were placed in an oven at 120° C. under air for two weeks. After two weeks at 120° C. and reconditioning to room temperature, a shear strength of still 5.8 MPa are found.

Example 9

The dispersion from example 7 was brushed onto stainless steel plates and dried, resulting in a tack-free film (0.1 g/625 mm²). A very thin film (<0.01 g) of a solution of monomer 4 (20% w/w in Monomer 1) was wiped onto one plate and the plate was pressed together with a second one (without monomer) with an overlap of 625 mm² and fixed. After 48 h at room temperature a lap shear test was performed (Zwick Roell testing machine with 10 mm/min).

A shear strength of 8 MPa are reached.

Example 10 (Comparative)

The dispersion from example 7 was brushed onto stainless steel plates and dried, resulting in a tack-free film (0.1 g/625 mm²). Two plates were pressed together with an overlap of 625 mm² and fixed. After 48 h at room temperature a lap shear test was performed (Zwick Roell testing machine with 10 mm/min).

A shear strength of only 2 MPa are reached.

The invention claimed is:

1. A polyurethane-vinyl hybrid polymer comprising, in reacted form, at least one anionic polyurethane and at least one polymerizable vinyl compound, wherein the polymerizable vinyl compound is selected from the group consisting of methylene malonates, methylene beta-ketoesters and methylene beta-diketones;

and wherein
a) the polyurethane-vinyl hybrid polymer is formed by first coating a substrate with an aqueous anionic polyurethane dispersion and subsequently overcoating with the polymerizable vinyl compound wherein the ratio of anionic groups of the polyurethane to vinyl groups of the polymerizable vinyl compound is greater than 1:9; or
b) wherein the polyurethane-vinyl hybrid polymer is formed in an aqueous dispersion.

2. The polyurethane-vinyl hybrid polymer according to claim 1, wherein the molar ratio of the anionic groups of the polyurethane to the vinyl groups of the polymerizable vinyl compound is greater than 1:1.

3. The polyurethane-vinyl hybrid polymer according to claim 1, wherein the polyurethane has an amount of anionic groups from 50 mmol/kg to 500 mmol/kg based on dry material, and wherein the anionic groups are selected from the group consisting of carboxylate groups, sulfonate groups and phosphate groups.

4. The polyurethane-vinyl hybrid polymer according to claim 1, wherein the Polyurethane has an amount of anionic groups from 50 mmol/kg to 500 mmol/kg based on dry material, and wherein the anionic groups are carboxylate groups.

5. The polyurethane-vinyl hybrid polymer according to claim 1, wherein the anionic polyurethane comprises, in reacted form:
a) one or more diisocyanates,
b) one or more polyesterdiols with molar mass of greater than 500 to 5000 g/mol, and/or one or more polyetherdiols with molar mass of from 240 to 5000 g/mol,
c) one or more diols having carboxylic acid groups, and
d) optionally one or more further mono- or polyfunctional compounds which differ from a)-c) and have reactive groups, selected from the group consisting of alcoholic hydroxy groups, primary amino groups, secondary amino groups, and isocyanate groups.

6. The polyurethane-vinyl hybrid polymer according to claim 1, wherein the anionic polyurethane has a glass transition temperature, prior to polymerization of the polymerizable vinyl compound, below 0° C.

7. The polyurethane-vinyl hybrid polymer according to claim 1, wherein the polymerizable vinyl compound is a methylene malonate having a formula

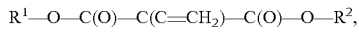

or wherein the polymerizable vinyl compound is a methylene beta-ketoester having a formula

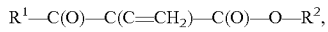

or wherein the polymerizable vinyl compound is a methylene beta-diketone having a formula

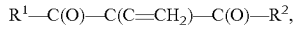

wherein $R^1$ and $R^2$ are each independently C1-C15 alkyl, C2-C15 alkenyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl or heteroaryl-(C1-C15 alkyl), or alkoxy-(C1-15 alkyl), each of which may be optionally substituted by C1-C15 alkyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl, C1-C15 alkoxy, C1-C15 alkylthio, hydroxyl, nitro, azido, cyano, acyloxy, carboxy, ester or sulfonyl;

or wherein $R^1$ and $R^2$ are taken together with the atoms to which they are bound to form a 5-7 membered heterocyclic ring which may be optionally substituted by C1-C15 alkyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl, C1-C15 alkoxy, C1-C15 alkylthio, hydroxyl, nitro, azido, acyloxy, carboxy, ester or sulfonyl.

8. The polyurethane-vinyl hybrid polymer according to claim 1, wherein the polymerizable vinyl compound has a formula:

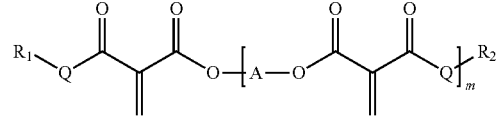

wherein $R^1$ and $R^2$ are each independently C1-C15 alkyl, C2-C15 alkenyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl or heteroaryl-(C1-C15 alkyl), or alkoxy-(C1-15 alkyl), each of which may be optionally substituted by C1-C15 alkyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl, C1-C15 alkoxy, C1-C15 alkylthio, hydroxyl, nitro, azido, cyano, acyloxy, carboxy, ester or sulfonyl;

or wherein $R^1$ and $R^2$ are taken together with the atoms to which they are bound to form a 5-7 membered heterocyclic ring which may be optionally substituted by C1-C15 alkyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl, C1-C15 alkoxy, C1-C15 alkylthio, hydroxyl, nitro, azido, acyloxy, carboxy, ester or sulfonyl;

[A]- represents —$(CR^A R^B)_n$—, —$(CR^A R^B)_n$—O (C=O)—$(CH_2)_{1-15}$—(C=O)O—$(CR^A R^B)_n$—, —$(CH_2)_n$—[CY]—$(CH_2)_n$, a polybutadienyl linking group, a polyethylene glycol linking group, a polyether linking group, a polyurethane linking group, an epoxy linking group, a polyacrylic linking group, or a polycarbonate linking group;

each instance of $R^A$ or $R^B$ is independently H, $C_1$-$C_{15}$ alkyl, $C_2$-$C_{15}$ alkenyl, or a moiety represented by the formula:

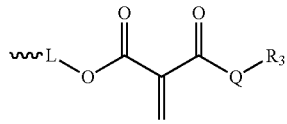

wherein L is a linking group selected from the group consisting of alkylene, alkenylene, haloalkylene, cycloalkylene, cycloalkylene, heterocyclylene, heterocyclyl alkylene, aryl-alkylene, heteroarylene, heteroaryl-(alkylene), and alkoxy-(alkylene), each of which may be optionally branched and each of which may be optionally substituted by alkyl, haloalkyl, cycloalkyl, halo cycloalkyl, heterocyclyl, heterocyclyl-(alkyl), aryl, aryl-(alkyl), heteroaryl, $C_1$-$C_{15}$ alkoxy, $C_1$-$C_{15}$ alkylthio, hydroxyl, nitro, azido, cyano, acyloxy, carboxy, ester, each of which may be optionally branched;

$R_3$ is independently selected from the group defined in $R_2$ above;

[CY] represents an alkyl, alkenyl, haloalkyl, cycloalkyl, halo cycloalkyl, heterocyclyl, heterocyclyl-(alkyl), aryl-(alkyl), heteroaryl or heteroaryl-(alkyl), or alkoxy-(alkyl) group;

n is an integer from 1 to 25;
m is an integer from 1 to 25; and
each instance of Q represents —O— or a direct bond.

9. The polyurethane-vinyl hybrid polymer according to claim 1, wherein the polymerizable vinyl compound has a formula

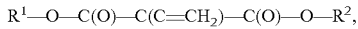

wherein $R^1$ and $R^2$ are each independently C1-C10 alkyl;
or wherein the polymerizable vinyl compound has a formula

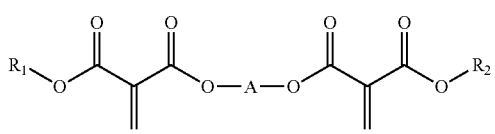

wherein $R^1$ and $R^2$ are each independently C1-C10 alkyl, and
A is selected from the group consisting of C1-C10 alkylene and —X-Ph-Y—, wherein X and Y are each independently C1-C10 alkylene.

10. The polyurethane-vinyl hybrid polymer according to claim 1, wherein the polyurethane-vinyl hybrid polymer is contained in an aqueous dispersion.

11. The polyurethane-vinyl hybrid polymer according to claim 1, wherein the polyurethane-vinyl hybrid polymer is semi-crystalline at room temperature and made from amorphous anionic polyurethane;
or wherein the polyurethane-vinyl hybrid polymer is crystalline at room temperature and made from semi-crystalline anionic polyurethane.

12. The polyurethane-vinyl hybrid polymer according to claim 1, wherein the polymerizable vinyl compound is a methylene malonate.

13. The polyurethane-vinyl hybrid polymer according to claim 1, wherein the ratio of anionic groups of the polyurethane to vinyl groups of the polymerizable vinyl compound is greater than 1:1, and wherein the polymerizable vinyl compound is at least one methylene malonate with two or more methylene malonate groups.

14. A two-component composition comprising a first liquid composition and a second liquid composition, wherein the first liquid composition comprises at least one anionic polyurethane, and the second liquid composition comprises at least one polymerizable vinyl compound selected from the group consisting of methylene malonates, methylene beta-ketoesters and methylene beta-diketones.

15. A method of forming a polyurethane-vinyl hybrid polymer,
comprising reacting at least one anionic polyurethane with at least one polymerizable vinyl compound selected from the group consisting of methylene malonates, methylene beta-ketoesters and methylene beta-diketones,
wherein the reacting is performed in a liquid medium to form a one-component composition comprising at least one polyurethane-vinyl hybrid polymer;
or comprising mixing a first liquid composition comprising the at least one anionic polyurethane and a second liquid composition comprising the at least one polymerizable vinyl compound to form a mixture, and subsequently applying the mixture to a substrate, wherein the formation of the polyurethane-vinyl hybrid polymer occurs at least partly after application to the substrate;
or comprising forming the polyurethane-vinyl hybrid polymer by first coating a substrate with the at least one anionic polyurethane and subsequently overcoating the first coating with the at least one polymerizable vinyl compound with a molar ratio of the anionic groups of the polyurethane to the vinyl groups of the polymerizable vinyl compound of greater than 1:9.

16. A method of forming a laminate, comprising:
(1) coating a polymer film with at least one anionic polyurethane;
(2) storing the coated polymer film for at least 1 day;
(3) overcoating the coated polymer film with at least one polymerizable vinyl compound,
wherein the molar ratio of the anionic groups of the polyurethane to the vinyl groups of the polymerizable vinyl compound is greater than 1:9, and wherein the polymerizable vinyl compound is selected from the group consisting of methylene malonates, methylene beta-ketoesters and methylene beta-diketones; and wherein the polymerizable vinyl compound has at least two functional groups selected from the group consisting of a methylene malonate group, a methylene beta-ketoester group and a methylene beta-diketone group; and
(4) laminating the overcoated polymer film to a substrate.

* * * * *